Jan. 22, 1957  J. J. GOODRIE  2,778,620
WATER AERATING DEVICES
Original Filed Sept. 1, 1951

INVENTOR.
Joseph J. Goodrie.
BY
Albert J. Fike
ATTORNEY.

United States Patent Office 2,778,620
Patented Jan. 22, 1957

2,778,620

WATER AERATING DEVICES

Joseph J. Goodrie, Chicago, Ill.

Original application September 1, 1951, Serial No. 244,772. Divided and this application September 30, 1953, Serial No. 383,160

1 Claim. (Cl. 261—76)

This invention relates to improved water aerating devices, and the present application is a division of my application for patent entitled, "Shower Head for Aerating Water," filed September 1, 1951, Serial No. 244,772 and now abandoned.

The aforesaid application discloses an improvement of a previously filed application for patent entitled, "Aerating Shower Head," which is now United States Patent No. 2,565,554, dated August 28, 1951.

The device additionally comprises an improvement of my prior United States patent entitled "Unitary Flush Valve Connection," granted October 25, 1938, No. 2,134,182.

This invention also comprises an improvement of my previous United States patent entitled "Water and Air Mixing Device," No. 2,510,395, dated June 6, 1950.

I have also a further United States patent entitled, "Aerating Device," No. 2,510,396, dated June 6, 1950, and regarding which the present invention comprises an additional improvement.

The water aerating devices disclosed in this application relate to further and improved means for aerating the stream of water issuing from a faucet or other conduit, and which will produce a bubbly stream of water mixed with air, rendering the same more palatable for drinking purposes and tending to remove objectionable chemicals such as chlorine gas, which is added to water in some localities for sterilizing the same.

Another object is to provide water aerating devices which will so thoroughly mix air with the issuing water that a coherent, non-splashing jet will result, rendering the same more desirable for housewives, particularly in the kitchen when washing dishes or the like.

A still further important object of the invention resides in the production of water aerating devices which will so thoroughly aerate the liquid that it will combine more readily with detergents and soaps, forming a multiplicity of bubbles and a resultant great deal of suds.

Other and further important objects of the invention will be apparent from the disclosures in the accompanying drawings and following specification.

The invention, in a preferred form, is illustrated in the drawings and hereinafter more fully described.

Figure 3:
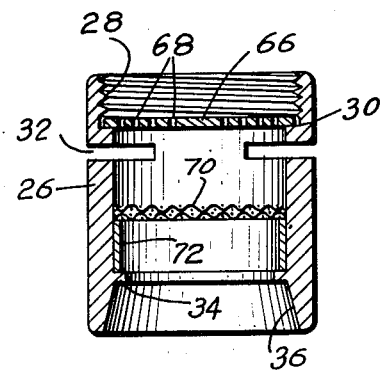
Figure 3 shows a further modification wherein one of the elements of Figures 1 and 2 is omitted.
Figure 4:
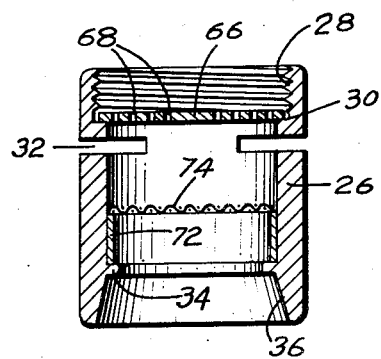

Figure 4 relates to a still further modification, this being somewhat along the lines of the structure of Figure 3.

As shown in the drawings:

Referring more generally to all the figures, the device comprises essentially a cylindrical element 26 interiorly threaded as shown at 28 whereby same can be conveniently attached to a faucet or other outlet for water.

Figure 1:
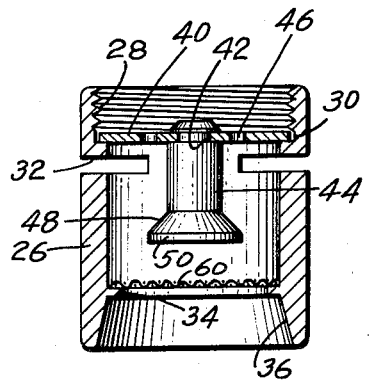
Figure 1 is a sectional view of one of the improved water aerating devices of this invention, showing the same in approximately double actual size.
Figure 2:
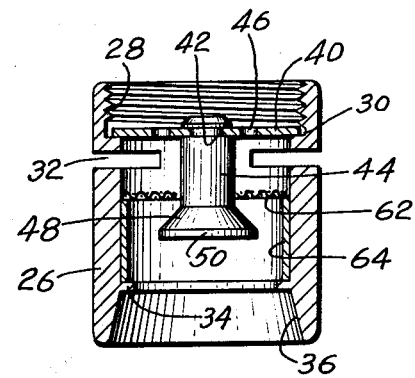
Figure 2 illustrates a slightly modified form of the invention of Figure 1.

Just below the interiorly threaded upper portion 28 is an integral shoulder 30, upon which a perforated disc 40 is adapted to rest. This disc is shown in Figures 1 and 2 only. In Figures 3 and 4 a similar disc 66 is employed, having perforations 68.

Just below the shoulder 30 and also below the perforated disc in each case is a series of air inlet ports 32. These are usually three in number and are of sufficient size to enable a desired quantity of air to be drawn in through these ports by the aspirating action of the incoming water, which acquires considerable velocity when forced through the perforated discs.

The perforations in the discs 40 in Figures 1 and 2 are indicated by the reference numerals 46, and are smaller in number but greater in size than the perforations 68 in the discs 66 of Figures 3 and 4.

Mounted centrally of each of the perforated discs 40 is a water and air mixing element, the main portion of which is cylindrical as shown at 44. This element is fixed into the opening 42 in the disc 40 and its head is riveted over or otherwise spread so that it will be retained in desired position.

This water and air mixing element terminates in a lower portion which is frusto-conical as shown at 48 with its lowermost and outermost rim again formed cylindrically for a relatively short portion thereof, as indicated at 50.

Referring now more particularly to Figure 1, there is formed in the inner face of the casing 26, and spaced slightly upwardly from the lower end thereof, an integral shoulder 34. This is adapted to receive and support a circular screen 60 which is of such a mesh size that the air and water which have been thoroughly mixed in the casing 26 by reason of contact with the element 44—48—50, will be caused to issue from the casing in a white, coherent, bubbly, non-splashing stream. This effect is aided by the outwardly flared lower inner edge 36 of the casing 26.

The air and water will remain so mixed for quite some time after issuance from the device, and the advantages of an aerated, non-splashing, bubbly stream will be immediately apparent.

In Figure 2, the screen 60 of Figure 1 is omitted, but a sleeve 64 is inserted in the casing resting upon the shoulder 34. The upper edge of this sleeve is at a level slightly above the point of juncture of the conical and cylindrical portions of the water and air mixing element 44—48—50.

A screen 62, centrally puched to fit about the cylindrical portion 44 of the water and air mixing element, rests upon the upper edge of the sleeve 64.

In this embodiment, the jets of water passing through the openings 46 in the disc 40 will impinge first upon the screen 62 while at the same time drawing in air through the ports 32. These mixed streams of air and water will then pass through the screen 62, in turn impinging upon the conical face 48 of the water and air mixing element, and will finally issue from the lower end of the casing 26 also in a bubbly coherent, non-splashing stream of mixed air and water.

In the structures of Figures 3 and 4, the water and air mixing element 44—48—50 is omitted. The jets of water passing through the smaller but more numerous openings 68 in the perforated discs 66 create a Venturi action similar to the action in the devices of Figures 1 and 2, whereby a desired quantity of air is brought in through the ports 32.

This mixed air and water then impinges upon a plurality of screens 70 shown in Figure 3, which screens are supported upon a sleeve 72 held in place by the integral shoulder 34.

In this case too, the resultant stream comprises a thorough mixture of air and water which is white, filled with numerous air bubbles, and which issues from the device in a coherent, non-splashing formation which persists in maintaining such formation for from one to twenty-five inches beyond the orifice.

The structure shown in Figure 4 is quite similar to that of Figure 3 except that a single screen 74 is employed instead of the double screen formation 70, and here again, these screens may be of various mesh sizes depending upon the desired quality of aeration and the coherency of the resultant stream.

The devices of this invention are simple of construction, very efficient in operation, relatively economical to manufacture, and can be readily taken apart and cleaned if clogged owing to sediment or other foreign matter in the water.

I am aware that many changes may be made and numerous details of construction varied throughout a wide range without departing from the principles of this invention.

I claim as my invention:

A water aerating device comprising a cylinder, internal screw threads at the upper end of the cylinder for attaching the same to a source of water, an integral internal shoulder just below the screw-threaded portion, a plurality of air inlet ports in the cylinder below the shoulder, a perforated disc resting on the shoulder whereby jets of water issuing from the perforations create a Venturi action to bring in air through the ports, a primary water and air mixing means in the casing adjacent the ports, said water and air mixing means including a cylindrical block centrally mounted in the perforated disc and extending below the same, said cylindrical block terminating in an outwardly flared frusto-conical portion positioned below the air ports, a screen in the cylinder surrounding the block and positioned on the same just above the frusto-conical portion thereof, wherein the jets of water issuing from the perforated disc impinge upon the said screen and frusto-conical portion and are broken up and mixed with air which has entered the ports, a second integral internal annular shoulder in the casing adjacent the lower end thereof, a sleeve on the second shoulder for supporting the screen, and an outwardly flared exit portion of the cylinder below the sleeve, said sleeve fitting around the interior of the casing, and, with the screen and the frusto-conical element, comprising a secondary water and air mixing chamber.

References Cited in the file of this patent
UNITED STATES PATENTS

| | | |
|---|---|---|
| 2,120,620 | Mowery | June 14, 1938 |
| 2,134,182 | Goodrie | Oct. 25, 1938 |
| 2,210,846 | Aghnides | Aug. 6, 1940 |
| 2,316,832 | Aghnides | Apr. 20, 1943 |
| 2,510,395 | Goodrie | June 6, 1950 |
| 2,510,396 | Goodrie | June 6, 1950 |
| 2,565,554 | Goodrie | Aug. 28, 1951 |
| 2,633,343 | Aghnides | Mar. 31, 1953 |
| 2,643,104 | Holden | June 23, 1953 |
| 2,657,024 | Reinecke | Oct. 27, 1953 |